US012679259B2

(12) United States Patent (10) Patent No.: US 12,679,259 B2
Kim et al. (45) Date of Patent: Jul. 14, 2026

(54) REINFORCEMENT STRUCTURE FOR REAR SEAT INTERIM PORTION

(71) Applicants: HYUNDAI MOTOR COMPANY, Seoul (KR); Kia Corporation, Seoul (KR)

(72) Inventors: Mincheol Kim, Seoul (KR); Changuk Ha, Gwangmyeong-si (KR); KeonWoo Kim, Hwaseong-si (KR)

(73) Assignees: HYUNDAI MOTOR COMPANY, Seoul (KR); Kia Corporation, Seoul (KR)

( * ) Notice: Subject to any disclaimer, the term of this patent is extended or adjusted under 35 U.S.C. 154(b) by 354 days.

(21) Appl. No.: 18/380,382

(22) Filed: Oct. 16, 2023

(65) Prior Publication Data

US 2024/0375564 A1 Nov. 14, 2024

(30) Foreign Application Priority Data

May 10, 2023 (KR) ........................ 10-2023-0060274

(51) Int. Cl.
*B60N 2/00* (2006.01)
*B60N 2/42* (2006.01)
*B60R 16/04* (2006.01)
*B60K 1/04* (2019.01)

(52) U.S. Cl.
CPC ............ *B60N 2/4256* (2013.01); *B60R 16/04* (2013.01); *B60K 1/04* (2013.01); *B60K 2001/0433* (2013.01)

(58) Field of Classification Search
CPC ........ B60N 2/005; B60N 2/4256; B60K 1/04; B60K 2001/0433; B60K 2001/0422; B60R 16/04
USPC ............................................................ 296/64
See application file for complete search history.

(56) References Cited

U.S. PATENT DOCUMENTS

| | | | | |
|---|---|---|---|---|
| 10,486,514 | B2 * | 11/2019 | Takayanagi | B60L 50/70 |
| 2011/0284299 | A1 * | 11/2011 | Takahashi | B60L 50/66 |
| | | | | 180/65.21 |
| 2013/0220713 | A1 * | 8/2013 | Watanabe | H01M 10/613 |
| | | | | 180/65.1 |
| 2018/0370404 | A1 * | 12/2018 | Miyawaki | B60N 2/68 |
| 2023/0158898 | A1 * | 5/2023 | Yamamoto | B62D 25/24 |
| | | | | 180/279 |
| 2023/0311793 | A1 * | 10/2023 | Hayakawa | B60K 1/04 |
| | | | | 296/187.12 |
| 2024/0072356 | A1 * | 2/2024 | Sugihara | H01M 50/227 |
| 2025/0276740 | A1 * | 9/2025 | Inoue | B62D 25/20 |

* cited by examiner

*Primary Examiner* — Steven O Douglas
(74) *Attorney, Agent, or Firm* — MORGAN, LEWIS & BOCKIUS LLP

(57) ABSTRACT

A reinforcement structure for a rear seat interim portion includes a side member disposed outside a width direction of a vehicle body, a battery case mounted on a rear floor panel, and an upper transverse direction reinforcement connected to a lower portion of the rear floor panel, an outer end thereof connected to the side member, and the upper transverse direction reinforcement connected to the battery case through the rear floor panel.

12 Claims, 8 Drawing Sheets

REINFORCEMENT STRUCTURE FOR REAR SEAT INTERIM PORTION

This application claims priority to and the benefit of Korean Patent Application No. 10-2023-0060274 filed in the Korean Intellectual Property Office on May 10, 2023, the entire contents of which are incorporated herein by reference.

TECHNICAL FIELD

The present disclosure relates to an interim portion reinforcing structure. More particularly, the present disclosure relates to a reinforcement structure for a rear seat interim portion that may protect the occupant and electrical components by distributing the impact load in case of vehicle collision.

BACKGROUND

As a way to protect the occupant when a vehicle collides, a structure that induces deformation when a vehicle collides by setting a deformation section is applied.

However, this method may cause injury to the occupant due to excessive deformation and increase damage to electrical components, resulting in excessive repair costs.

In addition, in the collision load test scheduled to be applied in the future, the collision energy is increased by approximately 82% from the current regulation, and the application of the method that induces deformation of the vehicle body is expected to have a limit.

In other words, it is required to apply a structure that can protect occupant and electric components such as battery system by distributing the impact load in case of vehicle collision and minimize vehicle body deformation.

The above information disclosed in this Background section is only for enhancement of understanding of the background of the disclosure, and therefore it may contain information that does not form the prior art that is already known in this country to a person of ordinary skill in the art.

SUMMARY OF THE DISCLOSURE

The present disclosure attempts to provide a reinforcement structure for a rear seat interim portion that can protect the occupant and electrical components by distributing the impact load in the event of a vehicle collision.

A reinforcement structure for a rear seat interim portion according to an exemplary embodiment may include a side member disposed outside a width direction of a vehicle body, a battery case mounted on a rear floor panel, and an upper transverse direction reinforcement connected to a lower portion of the rear floor panel, an outer end thereof connected to the side member, and the upper transverse direction reinforcement connected to the battery case through the rear floor panel.

The reinforcement structure according to an exemplary embodiment may further include a cross member rear disposed under the rear floor panel in the width direction of the vehicle body, and a lower transverse direction reinforcement connecting the side member and the cross member rear.

The upper transverse direction reinforcement and the lower transverse direction reinforcement may be spaced apart in a vertical direction of the vehicle body to form a dual load path that transmits a crash load in the event of a vehicle body side collision.

The lower transverse direction reinforcement may include a lower reinforcement outer flange connected to an inner side face of the side member, a lower reinforcement lower flange connected to a lower side of the side member, and a lower reinforcement inner flange connected to an upper portion of the cross member rear.

The lower transverse direction reinforcement may include a lower reinforcement outer flange connected to an inner side face of the side member, a lower reinforcement lower flange connected to a lower side of the side member, and a lower reinforcement inner flange connected to an upper portion of the cross member rear.

A body of the lower transverse direction reinforcement may have an "L" shaped cross-section.

A body of the upper transverse direction reinforcement may have an "L"-shaped cross-section.

The reinforcement structure according to an exemplary embodiment may further include a cross end reinforcement connected to an inner side face of the side member and an upper portion of the rear floor panel.

The side member may further include an opening flange formed protrude upwardly, and the cross end reinforcement may include an outer flange connected with the opening flange, and an inner flange connected to the upper portion of the rear floor panel.

The cross end reinforcement may further include an inclined portion inclined to connect the outer flange and the inner flange.

The reinforcement structure may further include a cross member front disposed in front of the cross member rear, and the battery case may be mounted on the cross member rear and the cross member front.

The upper transverse direction reinforcement may be mounted on the interim part inclined in the rear direction of the side member.

According to the reinforcement structure for a rear seat interim portion according to an exemplary embodiment, by adding a reinforcing structure capable of distributing impact to the rear seat interim portion, deformation of the vehicle can be suppressed and occupant and electrical components can be protected.

In addition, the effects that can be obtained or predicted due to the embodiments of the present disclosure will be directly or implicitly disclosed in the detailed description of the embodiments of the present disclosure. That is, various effects expected according to an embodiment of the present disclosure will be disclosed within the detailed description to be described later.

BRIEF DESCRIPTION OF THE DRAWINGS

Since these drawings are for reference in explaining exemplary embodiments of the present disclosure, the technical idea of the present disclosure should not be construed as being limited to the accompanying drawings.

3

Figure 2:
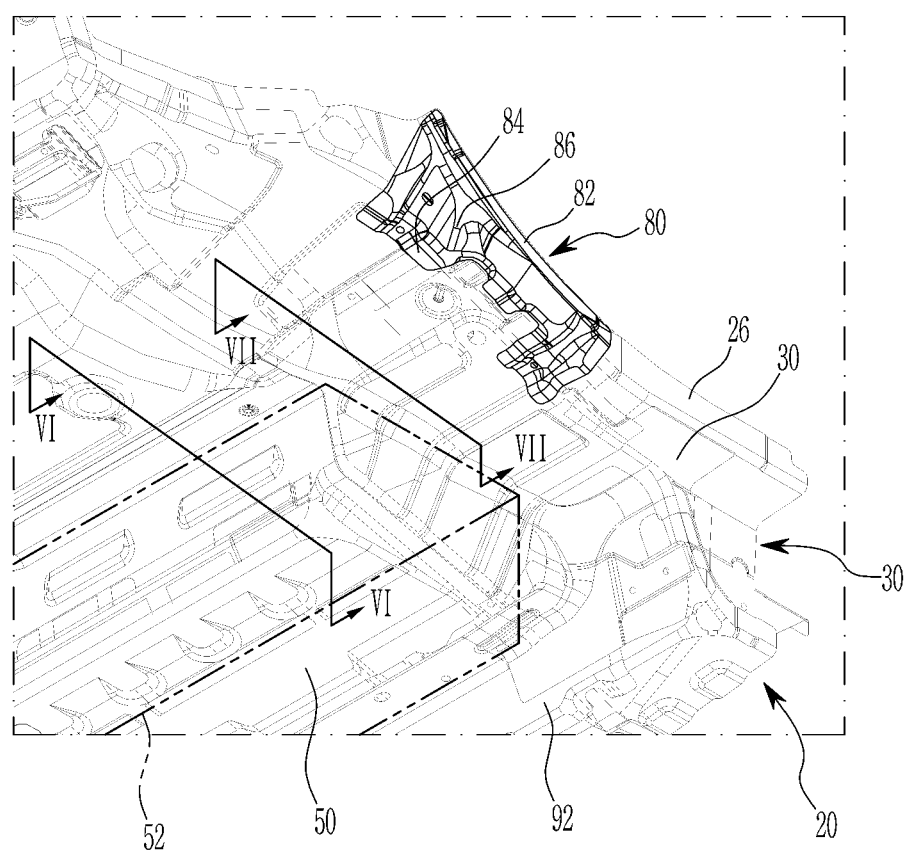
FIG. 2 is a partial perspective view of the vehicle body to which the reinforcement structure for a rear seat interim portion according to an exemplary embodiment is applied.
Figure 7:
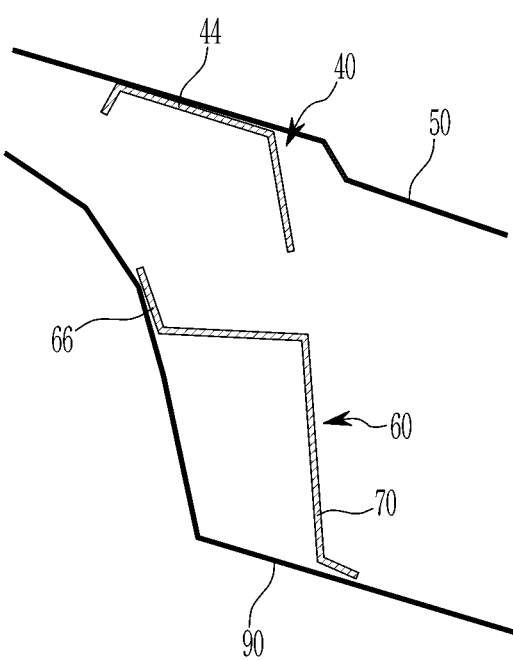

FIG. 7 is a cross-sectional view along the VII-VII line in FIG. 2.

Figure 8:
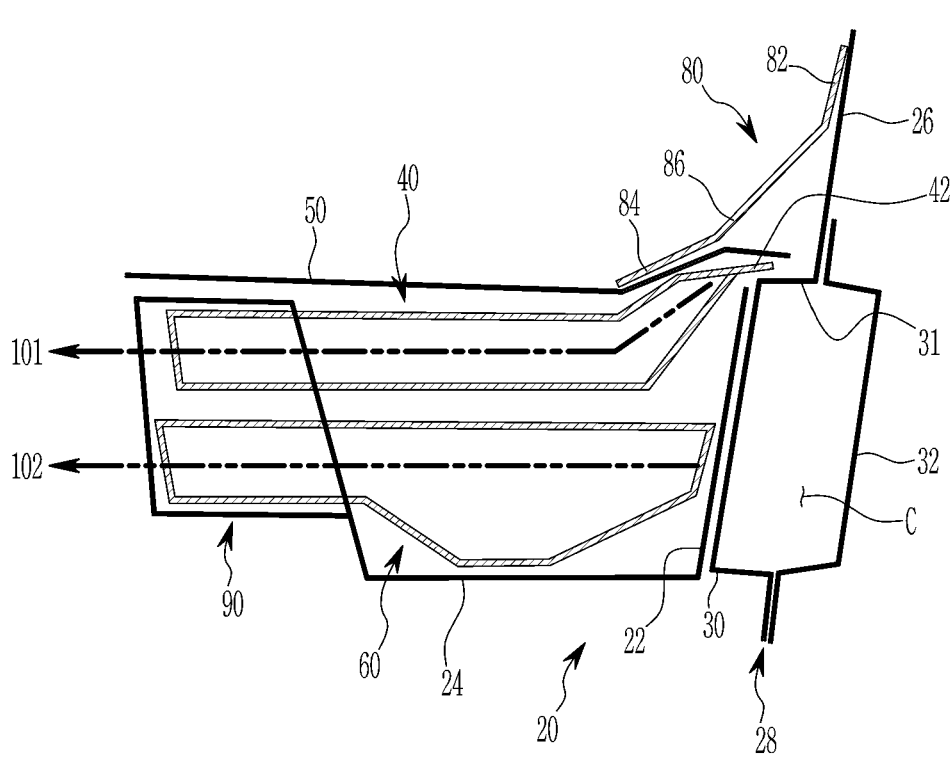

FIG. 8 is a drawing showing load paths of a rear seat interim portion according to an exemplary embodiment is applied.

DETAILED DESCRIPTION OF THE EMBODIMENTS

Hereinafter, with reference to the accompanying drawings, embodiments of the present disclosure will be described in detail so that those skilled in the art can easily carry out the present disclosure.

As those skilled in the art would realize, the described embodiments may be modified in various different ways, all without departing from the spirit or scope of the present disclosure.

In order to clearly describe the present disclosure, parts irrelevant to the description are omitted, and the same reference numerals are assigned to the same or similar components throughout the specification.

Since the size and thickness of each component shown in the drawings are arbitrarily shown for convenience of description, the present disclosure is not necessarily limited to those shown in the drawings, and the thickness is enlarged to clearly express various parts and regions.

And, in the following detailed description, the names of the components are divided into first, second, etc. to classify them based on the relationship in which the components are the same, and the order is not necessarily limited in the following description.

Throughout the specification, when a part includes a certain component, this means that it may further include other components without excluding other components unless otherwise stated.

In addition, terms such as . . . part, . . . means described in the specification mean a comprehensive unit of configuration that performs at least one function or operation.

When a part such as a layer, film, region, plate, etc. is said to be "on" another part, this includes not only the case directly on the other part, but also the case where there is another part in between.

In contrast, when an element is referred to as being "directly on" another element, there are no intervening elements present.

As used herein, 'vehicle', 'vehicular', 'automotive' or other similar terms as used herein generally refer to passenger vehicles, sports cars, sport utility vehicles (SUVs), buses, trucks, and various commercial vehicles including passenger automobiles, hybrid vehicles, electric vehicles, hybrid electric vehicles, electric vehicle-based PBVs (Purpose Built Vehicles), hydrogen-powered vehicles and other alternative fuel vehicles (e.g., other than petroleum fuel derived from resources).

An exemplary embodiment will hereinafter be described in detail with reference to the accompanying drawings.

Figure 1:
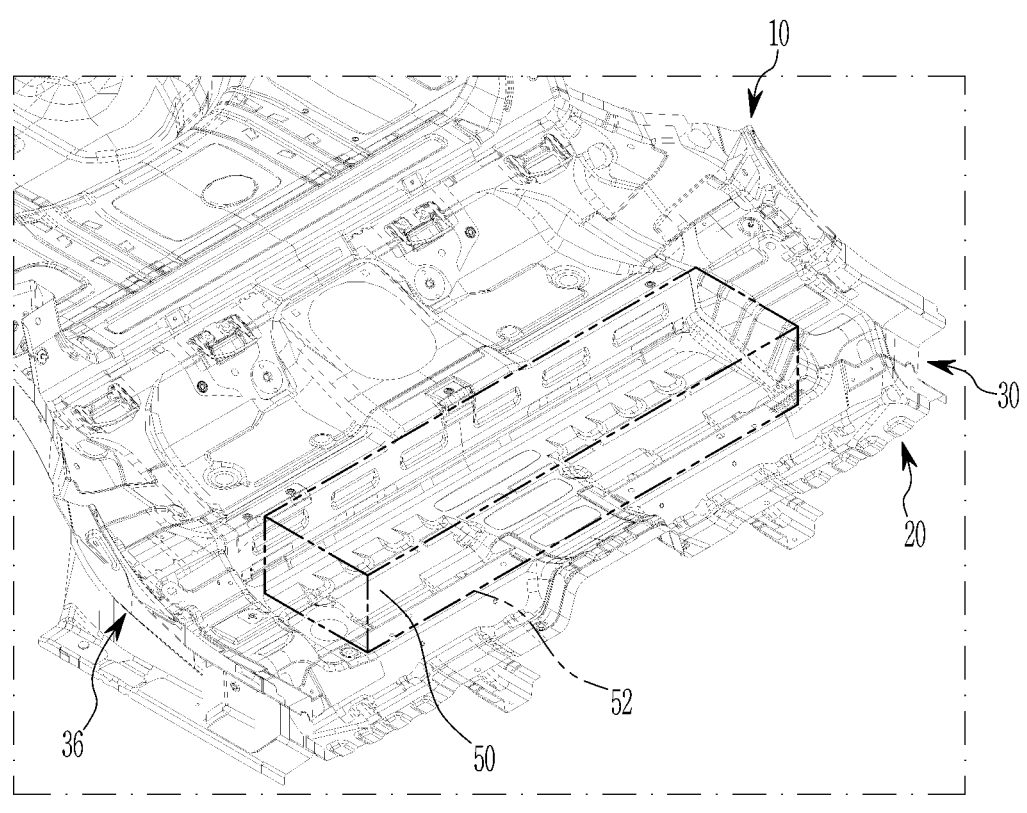
FIG. 1 is a partial perspective view of a vehicle body to which a reinforcement structure for a rear seat interim portion according to an exemplary embodiment is applied.

FIG. 1 is a partial perspective view of a vehicle body to which a reinforcement structure for a rear seat interim portion according to an exemplary embodiment is applied, and FIG. 2 is a partial perspective view of the vehicle body to which the reinforcement structure for a rear seat interim portion according to an exemplary embodiment is applied.

Referring to FIG. 1 and FIG. 2, a reinforcement structure for a rear seat interim portion according to an exemplary embodiment may increase the strength of the width direction of an interim portion 36 inclined in the rear direction of a vehicle body 10 and disperse the crash load during a side-direction collision of the vehicle.

In this specification, the 'front to rear direction of the vehicle body' may be defined as the longitudinal direction of the vehicle body, the 'vehicle width direction' may be defined as the left-right direction of the vehicle body, and the 'up-and-down direction' may be defined as the height direction of the vehicle body.

Furthermore, in this specification, 'upper end', 'upper portion', or 'upper surface' of a component indicates an end, portion, or surface of a component that is relatively upper in the drawing, and 'lower end', 'lower portion', or 'lower surface' of a component indicates an end, portion, or surface of a component that is relatively lower in the drawing.

Furthermore, in this specification, an end of a component (eg, one end or another (other) end, etc.) denotes an end of a component in any one direction, and an end portion of the component (e.g., one end portion) or other (another) end portion, etc.) denotes a portion of a component that includes that end.

A side member 20 is disposed outside the width direction of the vehicle body 10 along the length direction of the vehicle body, a rear floor panel 50 is disposed at a lower portion of the vehicle body 10, and a cross member rear 90 (see FIG. 5) and a cross member front 92 (see FIG. 5) are disposed under the rear floor panel 50 along the width direction of the vehicle body 10.

A battery case 52 may be mounted on the rear floor panel 50.

Recently developed vehicles such as hybrid vehicles, battery electric vehicles, and hydrogen electric vehicles are equipped with high voltage batteries, and as a way to maximize space utilization, high voltage batteries may be mounted between the vehicle seat and the floor panel.

In general, as a method for protecting an occupant when a vehicle collides, a structure that sets a deformation section and induces deformation of a specific region when a vehicle collides is applied.

However, this method may cause injury to the occupant due to excessive deformation and increase damage to electrical components, resulting in excessive repair costs.

In addition, in the collision load regulations scheduled to be applied in the future, the current standard information is applied with an increase of approximately 82% of the collision energy, and the application of the method for inducing deformation of the vehicle body is expected to be limited.

In other words, it is required to apply a structure that can protect occupants and electric components such as a battery system by distributing the impact load in case of vehicle collision and minimize vehicle body deformation.

Particularly, in the interim portion of the rear seat, the rear occupant may ride and electric parts such as a high voltage battery may be mounted, so proper dispersion of the impact load is required in vehicle collide in a side direction.

In an exemplary embodiment, the battery case 52 is a case made of skeletal members and panels that protects electric parts such as a battery cell, a controller, and a blower motor, and may be mechanically connected to the rear floor panel 50.

In the event of a side collision of the vehicle, a part of the impact load transmitted to the rear floor panel 50 is transferred to the battery case 52, and through this, the battery case 52 may bear a part of the impact load, thereby reducing the deformation of the vehicle body 10. In addition, it is possible to prevent injury to the occupant and damage to electrical components.

Figure 3:
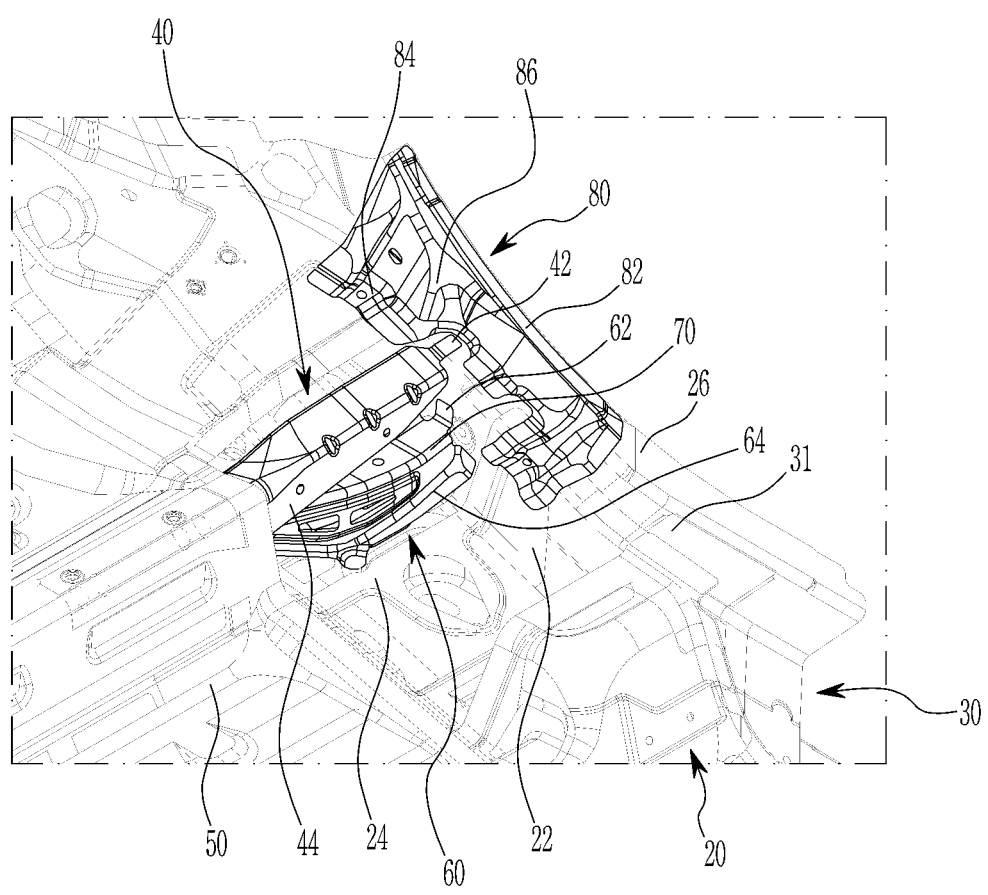
FIG. 3 to FIG. 5 are exploded perspective views of a part of the vehicle body to which the reinforcement structure for a rear seat interim portion according to an exemplary embodiment is applied.
Figure 4:
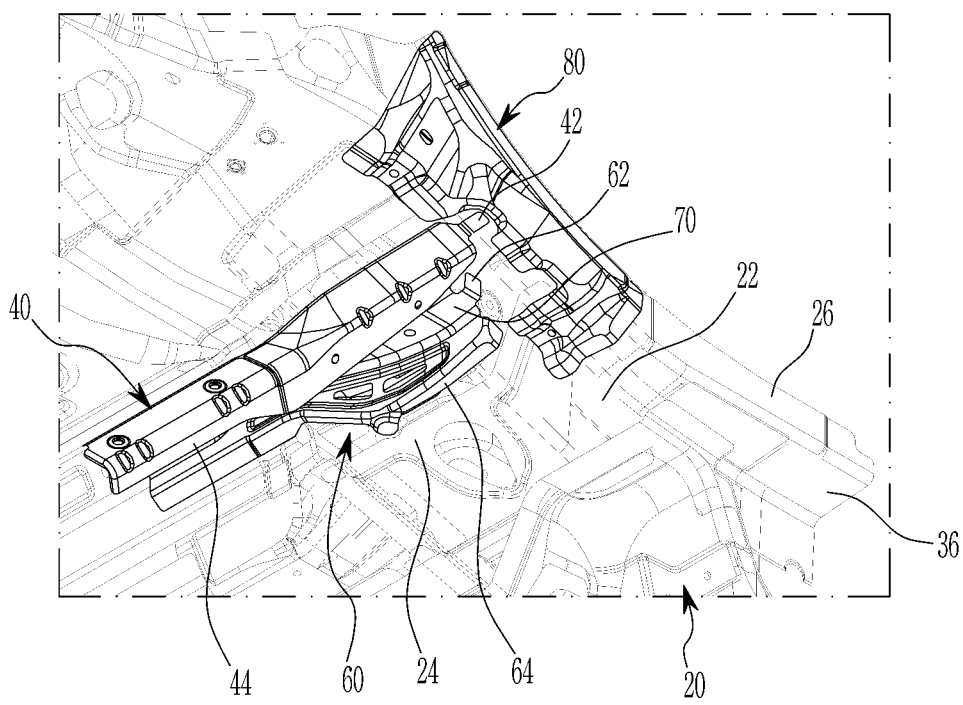
Figure 5:
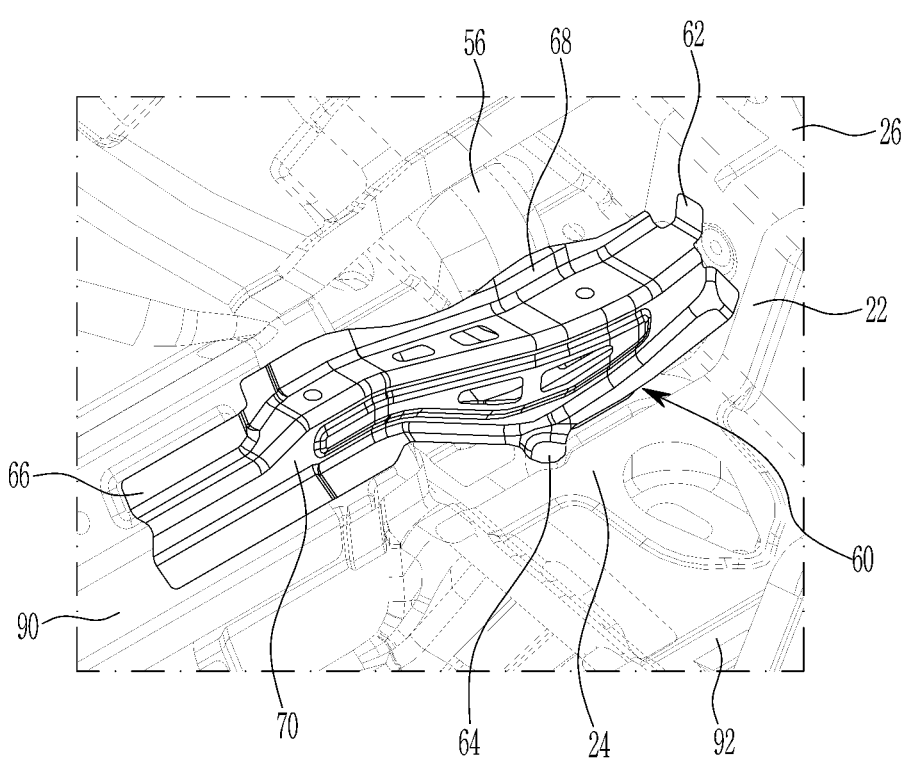

FIG. 3 to FIG. 5 are an exploded perspective view of a part of the vehicle body to which the reinforcement structure for a rear seat interim portion according to an exemplary embodiment is applied.

Figure 6:
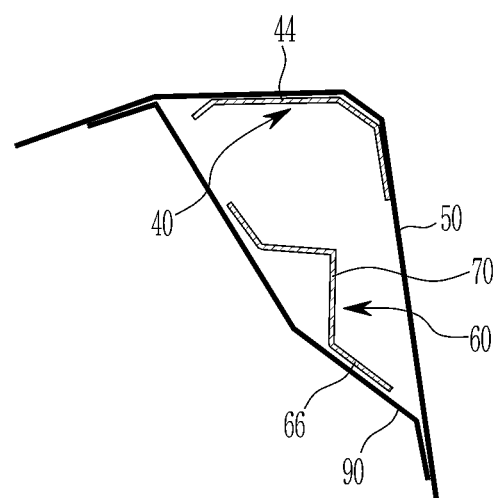
FIG. 6 is a cross-sectional view along the VI-VI line in FIG. 2.

FIG. 6 is a cross-sectional view along the VI-VI line in FIG. 2, FIG. 7 is a cross-sectional view along the VII-VII line in FIG. 2, and FIG. 8 is a drawing showing load paths of a rear seat interim portion according to an exemplary embodiment is applied.

Hereinafter, referring to FIG. 1 to FIG. 8, the reinforcement structure for a rear seat interim portion for dispersing impact energy according to an exemplary embodiment is described in detail.

Referring to FIG. 3, FIG. 4, FIG. 6 to FIG. 8, the reinforcement structure for a rear seat interim portion according to an exemplary embodiment may include the side member 20, the battery case 52, and an upper transverse direction reinforcement 40 connected to a lower portion of the rear floor panel 50, an outer end 42 thereof connected to the side member 20, and connected to the battery case 52 through the rear floor panel 50.

In case of a side collision of the vehicle, the upper transverse direction reinforcement 40 may receive the impact load transmitted from the side member 20 through the outer end 42 and distribute it to the battery case 52 through the rear floor panel 50.

Since the upper transverse direction reinforcement 40 may disperse a part of the impact load, it is possible to suppress the deformation of the vehicle body 10, prevent damage to the occupant, and prevent damage to electrical components.

The reinforcement structure for a rear seat interim portion according to an exemplary embodiment may further include a cross member rear 90 disposed in the lower portion of the rear floor panel 50 in the width direction of the vehicle body 10, and a lower transverse direction reinforcement 60 connecting the side member 20 and the cross member rear 90.

The lower transverse direction reinforcement 60 supports the side member 20 and suppresses deformation of the side member 20 to the inside of the vehicle body 10 in case of a side collision of the vehicle.

In addition, the lower transverse direction reinforcement 60 may distribute the impact load transmitted from the side member 20 to the vehicle body 10 through the cross member rear 90.

Referring to FIG. 5, the lower transverse direction reinforcement 60 includes a lower reinforcement outer flange 62 connected to an inner side face 22 of the side member 20, a lower reinforcement lower flange 64 connected to a lower side 24 of the side member 20, and a lower reinforcement inner flange 66 connected to the upper portion of the cross member rear 90.

The lower transverse direction reinforcement 60 is connected to the inside of the side member 20 through the flanges 62, 64, and 66 to suppress deformation of the side member 20 in the event of a side collision of a vehicle.

In addition, the lower transverse direction reinforcement 60 may distribute the impact load transmitted from the side member 20 to the vehicle body 10 through the cross member rear 90.

The lower transverse direction reinforcement 60 may further include a lower reinforcement rear flange 68 connected to a trailing arm mounting housing 56 disposed at the rear of the side member 20.

The lower transverse direction reinforcement 60 is connected to the inner side of the side member 20 and the front of the trailing arm mounting housing 56 to increase the side strength of the vehicle body 10.

Referring to FIG. 6 and FIG. 7, a body 70 of the lower transverse direction reinforcement 60 may have an "L" shaped cross-section.

The body 70 of the lower transverse direction reinforcement 60 forms a closed cross-section along the width direction of the cross member rear 90 and the vehicle body 10, and increases the width direction strength of the vehicle body 10.

The lower reinforcement inner flange 66 of the lower transverse direction reinforcement 60 may be welded on the upper portion of the cross member rear 90.

In addition, a body 44 of the upper transverse direction reinforcement 40 may have an "L"-shaped cross-section.

At least a part of the body 44 of the upper transverse direction reinforcement 40 may be connected to the lower portion of the rear floor panel 50 by welding.

The width direction strength of the vehicle body 10 may be increased by the cross-section shape of the lower transverse direction reinforcement 60 and the upper transverse direction reinforcement 40, and in case of a side collision of the vehicle, the lower transverse direction reinforcement 60 and the upper transverse direction reinforcement 40 may distribute the impact load transmitted from the side member 20 to the internal structure of the vehicle body 10.

Referring to FIG. 2 to FIG. 4, the reinforcement structure for a rear seat interim portion according to an exemplary embodiment may further include a cross end reinforcement 80 connected to the inner side face 22 of the side member 20 and an upper portion of the rear floor panel 50.

The side member 20 further includes an opening flange 26 formed protrude upwardly, and the cross end reinforcement 80 includes an outer flange 82 connected to the opening flange 26 and an inner flange 84 connected to the upper portion of the rear floor panel 50.

The cross end reinforcement 80 may further include an inclined portion 86 inclined to connect the outer flange 82 and the inner flange 84.

The cross end reinforcement 80 supports the side member 20 and suppresses deformation of the side member 20 to the inside of the vehicle body 10 at the beginning of a side collision of the vehicle.

In addition, the cross end reinforcement 80 may distribute the impact load transmitted from the side member 20 through the rear floor panel 50, and a part of the impact load may be distributed through the upper transverse direction reinforcement 40.

Referring to FIG. 1, FIG. 2 and FIG. 5, the reinforcement structure for a rear seat interim portion according to an exemplary embodiment further includes a cross member front 92 disposed in front of the cross member rear 90, and the battery case 52 is disposed on the cross member rear 90 and the cross member front 92.

The upper transverse direction reinforcement 40 may be mounted on an interim part 36 inclined in a rearward direction of the side member 20.

In general, the rear occupant may ride in the rear seat near an interim portion, and electrical components such as a high voltage battery may be mounted, so proper dispersion of the impact load is required in a side-direction collision to protect the rear occupant and the high voltage vehicle.

The upper transverse direction reinforcement 40 is mounted on the interim portion 36 to protect rear occupants and electric components such as a high voltage battery in the event of a side collision of a vehicle.

In addition, space utilization may be increased by mounting the battery case 52 on the interim portion 36.

Referring to FIG. 8, the upper transverse direction reinforcement 40 and the lower transverse direction reinforcement 60 may be spaced apart in a vertical direction to form dual load paths 101 and 102 that transmit crash loads in the event of a vehicle body side collision.

The side member 20 may include a side sill 28 that increases lateral strength of the vehicle body 10.

The side sill 28 may include a side sill inner 30 provided inside of the vehicle body 10 and a side sill outer 32 coupled to the outside of the side sill inner 30.

The side sill inner 30 and the side sill outer 32 are connected to form a closed cross space C on the side, and the side sill 28 receives a crash load during a side collision of the vehicle.

The outer end 42 of the upper transverse direction reinforcement 40 is connected to a side sill inner upper surface 31 of the side sill inner 30, for example welded, and a part of the impact load transmitted from the side sill 28 may be distributed to the inside of the vehicle body 10, that is, the rear floor panel 50 and the battery case 52 through the outer end 42 of the upper transverse direction reinforcement 40.

That is, the first load path 101 may be defined by the upper transverse direction reinforcement 40.

In addition, a part of the impact load transmitted from the side sill 28 may be transmitted to the lower transverse direction reinforcement 60.

The lower transverse direction reinforcement 60 is connected with the inner side face 22 of the side member 20 and the lower side 24 of the side member 20, for example, by welding, so that deformation of the side member 20 may be suppressed.

In addition, the lower transverse direction reinforcement 60 may be connected with the cross member rear 90 through the lower reinforcement inner flange 66, for example, welded to distribute the load transmitted from the side member 20 to the cross member rear 90.

That is, the second load path 102 may be defined by the lower transverse direction reinforcement 60.

The cross end reinforcement 80 is connected, for example, welded, through the opening flange 26 formed on the upper part of the side sill 28, and the outer flange 82 to receive a portion of the impact load transmitted from the side sill 28.

In addition, the cross end reinforcement 80 is connected with the rear floor panel 50 through the inner flange 84, for example, welded, so that the impact load transmitted from the side sill 28 may be distributed to the rear floor panel 50.

The inclined portion 86 of the cross end reinforcement 80 suppresses the deformation of the opening flange 26 to the inside of the vehicle body 10, and transfers the impact load transmitted from the side sill 28 to the rear floor panel 50.

The impact load transmitted from the cross end reinforcement 80 is distributed to the rear floor panel 50, and a part of the impact load may be distributed through the upper transverse direction reinforcement 40 connected to the rear floor panel 50.

As described above, according to the reinforcement structure for a rear seat interim portion according to an exemplary embodiment, deformation of the vehicle body is suppressed through reinforcement of the rear seat interim portion, the occupant is protected, and electric components such as a battery are prevented from being damaged.

While this disclosure has been described in connection with what is presently considered to be practical exemplary embodiments, it is to be understood that the disclosure is not limited to the disclosed embodiments. On the contrary, it is intended to cover various modifications and equivalent arrangements included within the spirit and scope of the appended claims.

What is claimed is:

1. A reinforcement structure for a rear seat interim portion comprising:
   a side member disposed on both sides of a vehicle body in a width direction;
   a battery case mounted on a rear floor panel; and
   an upper transverse direction reinforcement connected to a lower portion of the rear floor panel, an outer end thereof connected to the side member, and the upper transverse direction reinforcement connected to the battery case through the rear floor panel.

2. The reinforcement structure of claim 1, further comprising:
   a cross member rear disposed under the rear floor panel in the width direction of the vehicle body; and
   a lower transverse direction reinforcement connecting the side member and the cross member rear.

3. The reinforcement structure of claim 2, wherein the upper transverse direction reinforcement and the lower transverse direction reinforcement are spaced apart in a vertical direction of the vehicle body to form a dual load path that transmits a crash load in an event of a vehicle body side collision.

4. The reinforcement structure of claim 2, wherein the lower transverse direction reinforcement comprises:
   a lower reinforcement outer flange connected to an inner side face of the side member;
   a lower reinforcement lower flange connected to a lower side of the side member; and
   a lower reinforcement inner flange connected to an upper portion of the cross member rear.

5. The reinforcement structure of claim 4, wherein the lower transverse direction reinforcement further comprises
   a lower reinforcement rear flange connected to a trailing arm mounting housing disposed at a rear of the side member.

6. The reinforcement structure of claim 4, wherein a body of the lower transverse direction reinforcement has an "L" shaped cross-section.

7. The reinforcement structure of claim 1, wherein a body of the upper transverse direction reinforcement has an "L"-shaped cross-section.

8. The reinforcement structure of claim 1, further comprising
   a cross end reinforcement connected to an inner side face of the side member and an upper portion of the rear floor panel.

9. The reinforcement structure of claim 8, wherein the side member further comprises an opening flange formed protrude upwardly, and
   wherein the cross end reinforcement comprises:
   an outer flange connected with the opening flange; and
   an inner flange connected to the upper portion of the rear floor panel.

10. The reinforcement structure of claim 9, wherein the cross end reinforcement further comprises an inclined portion inclined to connect the outer flange and the inner flange.

11. The reinforcement structure of claim 2, further comprising: a cross member front disposed in front of the cross member rear, and
   wherein the battery case is mounted on the cross member rear and the cross member front.

12. The reinforcement structure of claim 1, wherein the upper transverse direction reinforcement is mounted on an interim part inclined in the rear direction of the side member.

\* \* \* \* \*